(12) United States Patent
Melzner

(10) Patent No.: US 7,794,121 B2
(45) Date of Patent: Sep. 14, 2010

(54) TWO-DIMENSIONAL LUMINAIRE

(75) Inventor: Erwin Melzner, Frasdorf (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 253 days.

(21) Appl. No.: 12/086,202

(22) PCT Filed: Dec. 4, 2006

(86) PCT No.: PCT/EP2006/011805

§ 371 (c)(1),
(2), (4) Date: Jun. 5, 2008

(87) PCT Pub. No.: WO2007/065698

PCT Pub. Date: Jun. 14, 2007

(65) Prior Publication Data

US 2010/0061114 A1    Mar. 11, 2010

(30) Foreign Application Priority Data

Dec. 6, 2005    (DE)    ........................ 10 2005 059 198

(51) Int. Cl.
*F21V 15/01*    (2006.01)
(52) U.S. Cl. .................. 362/362; 362/240; 362/555
(58) Field of Classification Search .................. 362/330, 362/230, 231, 240, 241, 247, 555, 362, 632, 362/633, 294, 373, 249.02, 800
See application file for complete search history.

(56) References Cited

U.S. PATENT DOCUMENTS

| 6,784,357 | B1 | 8/2004 | Wang | |
|---|---|---|---|---|
| 7,196,459 | B2 * | 3/2007 | Morris | 362/294 |
| 2004/0037087 | A1 | 2/2004 | Desai | |
| 2006/0274547 | A1 * | 12/2006 | Kao et al. | 362/560 |

FOREIGN PATENT DOCUMENTS

| DE | 199 62 837 A1 | 7/2001 |
|---|---|---|
| DE | 102 45 932 B3 | 2/2004 |
| DE | 20 2004 009 488 U1 | 2/2005 |
| DE | 20 2004 016 637 U1 | 2/2005 |
| DE | 20 2005 012 652 U1 | 12/2005 |

(Continued)

OTHER PUBLICATIONS

International Search Report, dated Mar. 27, 2007, corresponding to PCT/EP2006/011805.

(Continued)

*Primary Examiner*—Bao Q Truong
(74) *Attorney, Agent, or Firm*—Christie, Parker & Hale, LLP

(57) ABSTRACT

A surface luminaire with a luminous chamber in the form of a hollow fiberoptic conductor is provided. The luminous chamber comprising a peripheral frame, an emission opening and a base plate which is populated at least partially with light-emitting diodes and on which sloping faces are arranged. The sloping faces bridge the edge region of the base plate and a region of the peripheral frame which adjoins the base plate and form a cavity between the lower region of the peripheral frame, the edge region of the base plate and the sloping faces, in which cavity control electronics, which drive the light-emitting diodes, are arranged.

16 Claims, 3 Drawing Sheets

FOREIGN PATENT DOCUMENTS

| | | |
|---|---|---|
| EP | 1 376 708 A2 | 1/2004 |
| GB | 2 405 461 A | 3/2005 |
| JP | 2001 195904 A | 7/2001 |
| JP | 2001195904 A | 7/2001 |
| WO | WO 90/13885 | 11/1990 |
| WO | WO 01/48421 A1 | 7/2001 |

OTHER PUBLICATIONS

Patent Abstracts of Japan, Publication No. 2001195904 A, Published on Jul. 19, 2001, in the name of Takada.

English translation of International Preliminary Report on Patentability for corresponding PCT Application No. PCT/EP2006/011805, dated Oct. 23, 2008, 7 pages.

* cited by examiner

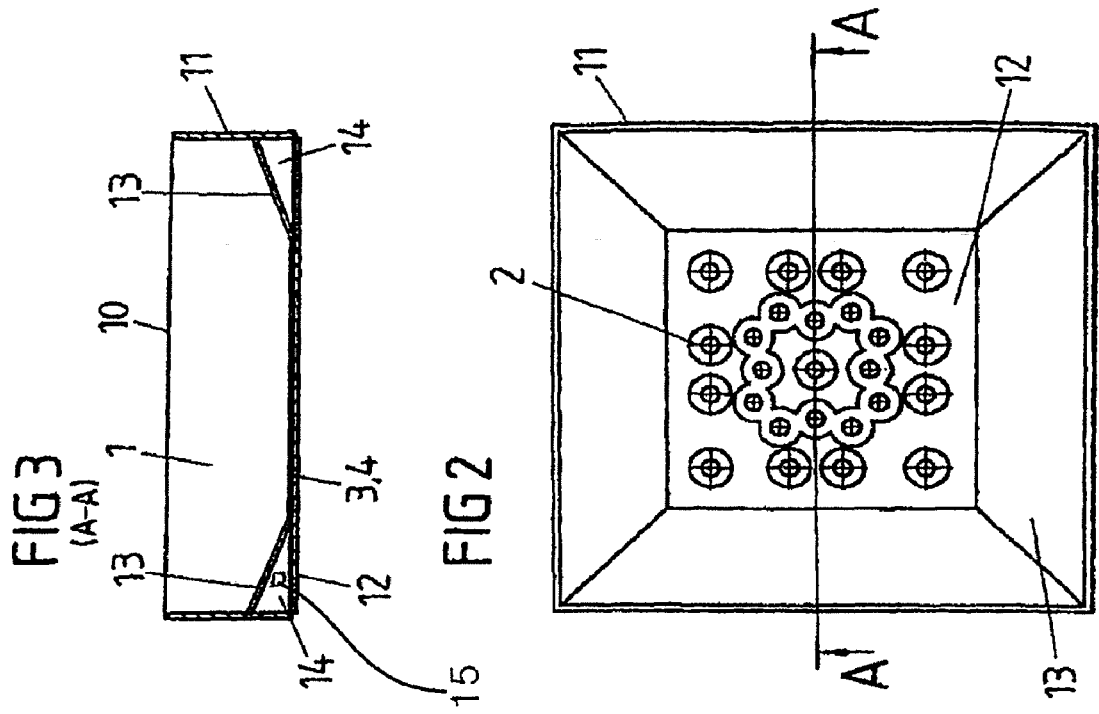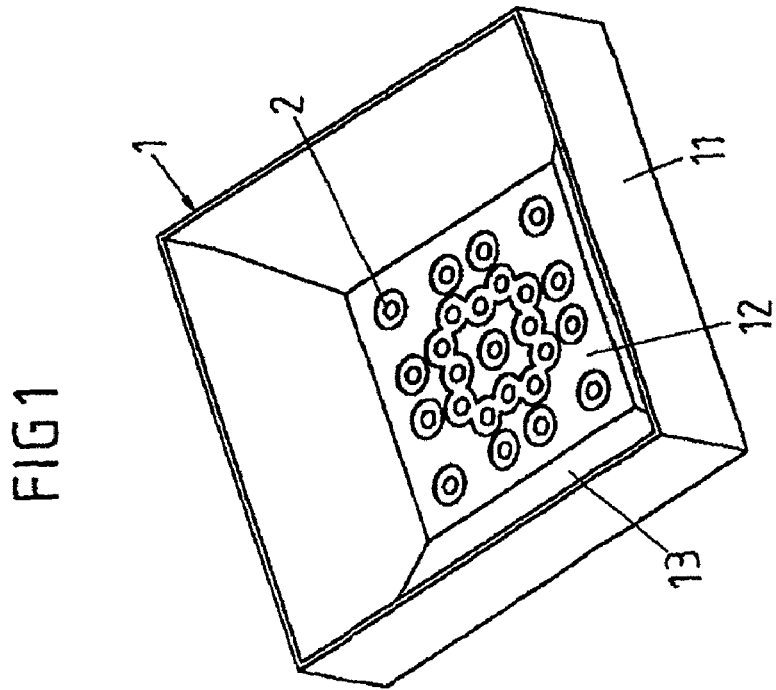

TWO-DIMENSIONAL LUMINAIRE

CROSS-REFERENCE TO A RELATED APPLICATION

This application is a National Phase Patent Application of International Patent Application Number PCT/EP2006/011805, filed on Dec. 4, 2006, which claims priority of German Patent Application Number 10 2005 059 198.1, filed on Dec. 6, 2005.

BACKGROUND

The invention relates to a surface luminaire with a luminous chamber in the form of a hollow fiberoptic conductor with a peripheral frame, an emission opening and a base plate populated at least partially with light-emitting diodes.

Luminous means referred to as light-emitting diodes or LEDs provide the possibility of producing flat spotlights which emit light homogeneously over the surface and which can be used in relatively large design forms in the form of surface luminaires with the designations "softlight", "fill-light" or reflector lamps in all sectors of professional lighting, as portrait luminaires in the immediate vicinity of a moving picture or video camera, in narrow areas, such as vehicles and stairwells, for example, and for constructing light walls in event and stage lighting.

Surface luminaires with light-emitting diodes as the luminous means have different designs. In a first design, a number of light-emitting diodes are arranged on the base of a luminous chamber in the form of a hollow fiberoptic conductor, which luminous chamber has reflecting walls and a diffusely transmitting cover. The light-emitting diodes radiate into the hemisphere above the base of the luminous chamber, with the light emitted by them being reflected a plurality of times diffusely and emerging from the surface luminaire with a large one-half-peak spread. The light-emitting diodes used here can have different diffusion characteristics such as "Lambertian", "batwing" or "side-emitting" diffusion characteristics, for example, it being possible to achieve a low physical height of the surface luminaire in particular when using side-emitting light-emitting diodes.

In a further design, light is radiated into a solid fiberoptic conductor, for example an acrylic block, surrounding the light-emitting diodes by a number of light-emitting diodes with a side-emitting characteristic which are arranged on the base of a luminous chamber, whereby the light mixing takes place within the solid fiberoptic conductor.

In another design, a number of light-emitting diodes are arranged on the inner edge of a housing frame, with the result that the light emitted by the light-emitting diodes is emitted towards the inside into a hollow chamber or in particular into a solid fiberoptic conductor.

DE 20 2004 016 637 U1 has disclosed a lighting device with a mount, on which a plurality of light-emitting diodes and control apparatuses are arranged, with which the operating state of the lighting device is adjusted. High-power light-emitting diodes with an optical efficiency of at least 20 lm/W which emit in particular white light and are referred to as "Golden Dragon" light-emitting diodes are used as the light-emitting diodes. Drive electronics with a light sensor which measures the ambient brightness and controls the brightness of the light-emitting diodes are used as the control apparatuses.

The use of such a lighting device in a surface luminaire has the disadvantage that the control apparatuses together with the light-emitting diodes are arranged on the mount and consequently reduce the light-emitting area of the lighting device.

The other designs mentioned above also have the disadvantage that the control electronics required for driving the light-emitting diodes need to be fitted outside the luminous chamber, with the result that the advantage of producing surface luminaires with a small physical height with the aid of light-emitting diodes is restricted by virtue of the fact that the control electronics either need to be arranged beneath the light-emitting diodes in order to keep the area which does not emit light as small as possible or by virtue of the fact that, in order to provide flat designs, the light-emitting diodes need to be arranged in the housing frame, which results in a relatively large, non-illuminating edge of the surface luminaire, however.

A further problem in the production of surface luminaires with a small physical height with at the same time a light-emitting area which is as large as possible consists in the fact that the heat emitted by the light-emitting diodes needs to be dissipated reliably for permanently stable operation. This applies in particular in the case of high-power light-emitting diodes which are embedded in a thermoplastic element containing the emission optical element.

SUMMARY

The object of the present invention is to specify a surface luminaire having as small as possible a physical height and containing light-emitting diodes with a light-emitting area which is as large as possible and of making possible the preconditions for optimum cooling of the light-emitting diodes and of the control electronics driving the light-emitting diodes.

The solution according to the invention provides a surface luminaire with a minimum physical height and with a maximum light-emitting area and provides the design preconditions for optimum cooling of the light-emitting diodes used as the luminous means of the surface luminaire and of the control electronics for driving the light-emitting diodes.

The solution according to the invention is based on the consideration of arranging a number of light-emitting diodes on a base plate, whose maximum light emission is directed parallel to the base plate, i.e. horizontally or at an acute angle of, for example, 20° with respect to the horizontal or the base plate.

Exemplary, the luminous chamber is in the form of a diffusely reflecting hollow fiberoptic conductor, with the result that optimum light distribution is ensured even in the case of a physical height of the luminous chamber which is as small as possible so as to achieve a luminous area which is as large as possible given a uniform light distribution.

In a exemplary embodiment of the invention, side-emitting LEDs, whose maximum light emission is directed horizontally, i.e. parallel to the base plate, as a result of their shape or is inclined at an acute angle with respect to the horizontal or the base plate, are used as the light-emitting diodes.

Furthermore, sloping faces, whose inclination and curvature are set in such a way that, despite the reduction in size of the reflection area of the luminous chamber, very good light and color distribution results, can be arranged between the peripheral frame and the base plate of the luminous chamber.

In particular as a result of the use of horizontally emitting light-emitting diodes in conjunction with sloping faces arranged in the luminous chamber, very good light and color distribution is achieved.

In order to achieve improved light distribution, the sloping faces can be curved concavely or convexly and/or ribbed or folded.

The design configuration of the luminous chamber of the surface luminaire according to the invention with sloping faces arranged between the peripheral frame and the base plate makes it possible to arrange the control electronics for driving the light-emitting diodes beneath the sloping faces and in particular in a cavity formed by the sloping faces, the base plate and the peripheral frame, with the result that there is no area taken up which is used for light generation or light reflection and therefore also no non-illuminating areas are produced. Furthermore, the precondition for optimum cooling of the control electronics and of the light-emitting diodes is thereby ensured.

The cooling in particular of the light-emitting diodes can take place by virtue of the fact that a highly thermally conductive board, such as a metal core or ceramic board, for example, is populated with light-emitting diodes, the board being fixed directly on a heat sink.

Exemplary, a board made of any desired printed circuit board material is populated with light-emitting diodes, under which there are apertures or holes, through which parts of a heat sink in the form of fingers are passed directly as far as the bases or cooling faces of the light-emitting diodes and are highly thermally conductively connected to the bases or cooling faces of the light-emitting diodes.

This manner of populating the luminous chamber with light-emitting diodes ensures optimum cooling even of high-power light-emitting diodes, with the result that a population density which is as large as possible can even take place for the purpose of emitting a maximum luminous efficiency.

A further exemplary which provides additional advantages with respect to cost-effective manufacture and the possibility of simple electrical insulation of the cooling faces of the light-emitting diodes is characterized by the fact that depressions are arranged in the face, which faces the light-emitting diodes, of the heat sink, into which depressions bolts are inserted and are thermally conductively connected to the base or the cooling face of the light-emitting diodes, the bolts being pressed into the depressions of the heat sink and comprising metal, preferably a metal with a higher thermal conductivity than aluminum, in particular copper.

If electrical insulation is required, in particular in the case of a conductive connection between the cooling faces of the light-emitting diodes and the anode or cathode, this can take place by means of a layer of electrically insulating, but highly thermally conductive material being inserted between the board and the heat sink or between the light-emitting diodes and the board, in particular between the cooling faces of the light-emitting diodes and the parts of the heat sink which protrude through the apertures, or the bolts. These layers may be sprayed-on, vapor-deposited or printed-on protective layers such as varnishes, for example, or so-called "thermally conductive pads" or "thermally conductive adhesives".

In the case of a connection between the base or the cooling face of the light-emitting diodes and a bolt which is inserted into depressions of the heat sink, bolts can be used which comprise a very highly thermally conductive and electrically insulating ceramic.

In order to protect the luminous chamber and in particular the light-emitting diodes and in order to make the emitted light more uniform, the emission opening can be provided with a light-permeable cover in the form of, for example, a transparent cover, frosted pane, lens or the like.

BRIEF DESCRIPTION OF THE DRAWINGS

The subject matter of the invention and further features and advantages of the surface luminaire according to the invention will be described with reference to the exemplary embodiments. In the figures:

FIG. 1 shows a schematically perspective view of a surface luminaire with a plurality of light-emitting diodes arranged on a base plate and a luminous chamber with a peripheral frame and sloping faces.

FIG. 2 shows a plan view of the surface luminaire shown in FIG. 1.

FIG. 3 shows a section through the surface luminaire along the line A-A shown in FIG. 2.

DETAILED DESCRIPTION

Figure 4:
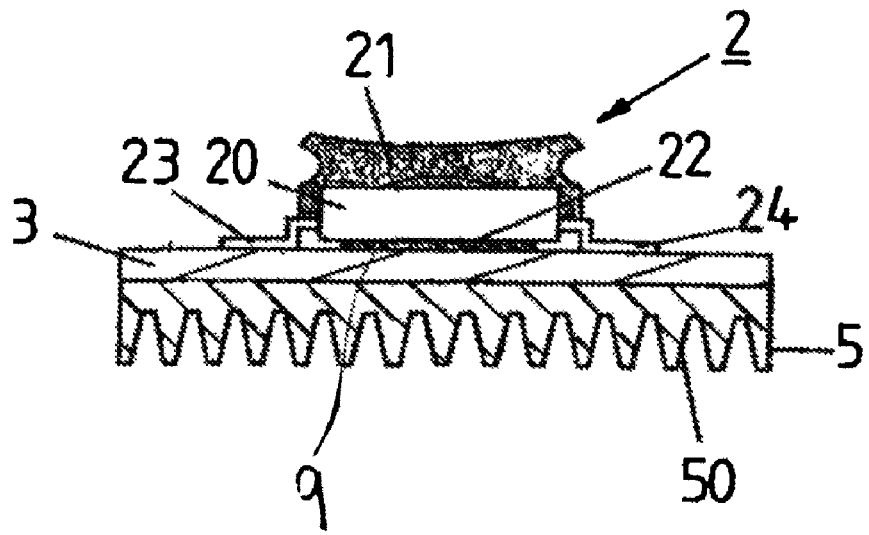
FIG. 4 shows a longitudinal section through an arrangement of a light-emitting diode with a side-emitting optical element on a metal core printed circuit board connected to a heat sink.

The surface luminaire illustrated in FIGS. 1 to 3 in a schematically perspective view, a plan view and a longitudinal section comprises a luminous chamber 1 in the form of a hollow fiberoptic conductor and a plurality of light-emitting diodes 2 arranged in accordance with a predeterminable distribution pattern in the luminous chamber 1. The luminous chamber 1 contains a peripheral frame 11 and a base plate 12, on which a board 3 with light-emitting diodes 2 is arranged and, with their light-emitting optical element, are aligned with an emission opening 10 of the luminous chamber 1. The edge region of the base plate and a region of the peripheral frame 11 which adjoins the base plate 12 are bridged by sloping faces 13, with the result that a cavity 14 is formed between the lower region of the peripheral frame 11, the edge region of the base plate 12 and the sloping faces 13.

Figure 5:
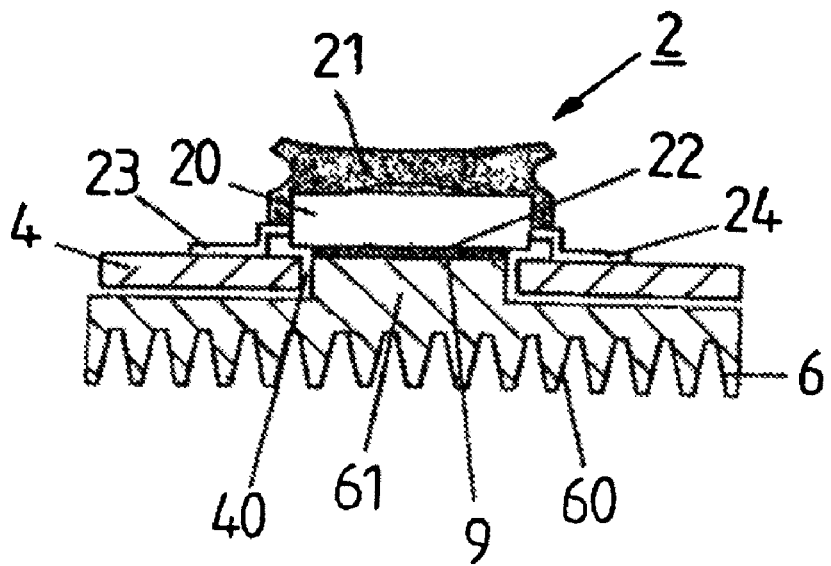
FIG. 5 shows a longitudinal section through an arrangement of a light-emitting diode with a side-emitting optical element on a printed circuit board with an aperture for making contact with the base or the cooling face of a light-emitting diode and with a finger of the heat sink which is passed through the aperture.

Any desired LEDs, but preferably side-emitting LEDs, which comprise, as shown in FIGS. 4 and 5, an LED 20 and a side-emitting optical element 21 with a lens holder consisting of transparent polycarbonate for the correct arrangement of the LED 20 and the lens and have a cooling face 22 for dissipating heat which ensures optimum mechanical strength, can be used as the light-emitting diodes 2. Such a side-emitting LED is marketed, for example, under the designation "Golden Dragon LED" by the company OSRAM. The side-emitting LED is produced with different emission angles, i.e. the maximum of the light emission of the side-emitting LEDs is horizontal or is inclined at an emission angle of, for example, up to 35° with respect to the horizontal. The high efficiency of such a side-emitting LED of up to 85% of the total luminous flux of an LED makes it possible to replace standard incandescent lamps and halogen light sources in terms of their lighting design and is particularly suitable for use in a flat surface luminaire.

For the present application case, horizontally emitting side-emitting LEDs, that is side-emitting LEDs which emit parallel to the base plate, and side-emitting LEDs which emit at an acute angle with respect to the horizontal, for example at an emission angle of approximately 20° with respect to the horizontal, can be used. In particular, a very good light and color distribution of the light emission of the surface luminaire is achieved with precisely horizontally emitting side-emitting LEDs in conjunction with sloping faces 13 arranged in the luminous chamber 1.

In order to optimize the light distribution in the luminous chamber 1 in the form of a hollow fiberoptic conductor, the sloping face 13 can comprise a concavely or convexly curved face instead of a planar face or alternatively or additionally be ribbed or folded, with the result that an optimum light diffusion is provided. The inclination or curvature of the sloping faces 13 with respect to the base plate 12 is in this case set in such a way that, despite the reduction in size of the reflection area of the luminous chamber 1, a very good light and color distribution results.

One or more control electronics 15 for driving the light-emitting diodes 2 is or are preferably arranged in the cavities 14 formed by the peripheral frame 11, the base plate 12 and the sloping faces 13, with the result that a separation between the hollow fiberoptic conductor and the control of or power supply to the light-emitting diodes 2 is provided, with neither the light-emitting nor the light-reflecting faces of the luminous chamber 1 being impaired by these additional devices. At the same time, a compact design of the surface luminaire is thus ensured, whose housing is determined exclusively by the peripheral frame 11 and the base plate 12. In order to further optimize the light diffusion and/or to protect the light-emitting diodes 2 arranged within the luminous chamber 1, the emission opening 10 can be covered by a transparent or translucent cover, such as a safety glass, a frosted pane, lens or the like, for example.

The cooling required for the light-emitting diodes 2, which are used in the luminous chamber 1 of the surface luminaire according to the invention and are in particular in the form of side-emitting LEDs, can take place as shown in the schematic illustrations in FIGS. 4 and 5.

FIG. 4 shows a standard solution, in which a light-emitting diode 2 includes an LED 20, a side-emitting optical element 21 and a cooling face 22 is arranged on a board 3 in the form of a metal core printed circuit board and is connected to wiring runs on the metal core printed circuit board 3 via connecting lines 23, 24. The cooling face 22 of the LED 20 is in highly thermally conductive contact with the likewise highly thermally conductive metal core printed circuit board 3, which is connected to a heat sink 5 with cooling ribs 50 on the side opposite the light-emitting diode 2, with the result that the heat emitted by the LED 20 is emitted to the heat sink 5 via the cooling face 22 and the highly thermally conductive metal core printed circuit board 3 and emitted via the cooling ribs 50 of said heat sink.

The standard solution shown in FIG. 4 makes it possible to arrange a large number of light-emitting diodes 2 directly next to one another or at any desired intervals and with any desired configurations on the metal core printed circuit board 3 in order to produce a desired emission pattern.

FIG. 5 illustrates a variant in which the light-emitting diode 2 is arranged on any desired printed circuit board or board 4 and likewise includes an LED 20, a side-emitting optical element 21, a cooling face 22 and connecting lines 23, 24, which are connected to wiring runs on the printed circuit board 4. Beneath the LED 20 of the light-emitting diode 2, the printed circuit board 4 has an aperture, through which a finger 61 of a heat sink 6, which is arranged on the side of the printed circuit board 4 which is opposite the light-emitting diode, protrudes and is thermally connected to the cooling face 22 of the light-emitting diode 2. The heat emitted by the LED 20 is therefore passed via the cooling face 22 and the finger 61 of the heat sink 6 to cooling ribs 60, which emit the heat emitted by the light-emitting diode 2 to the surrounding environment.

Figure 6:
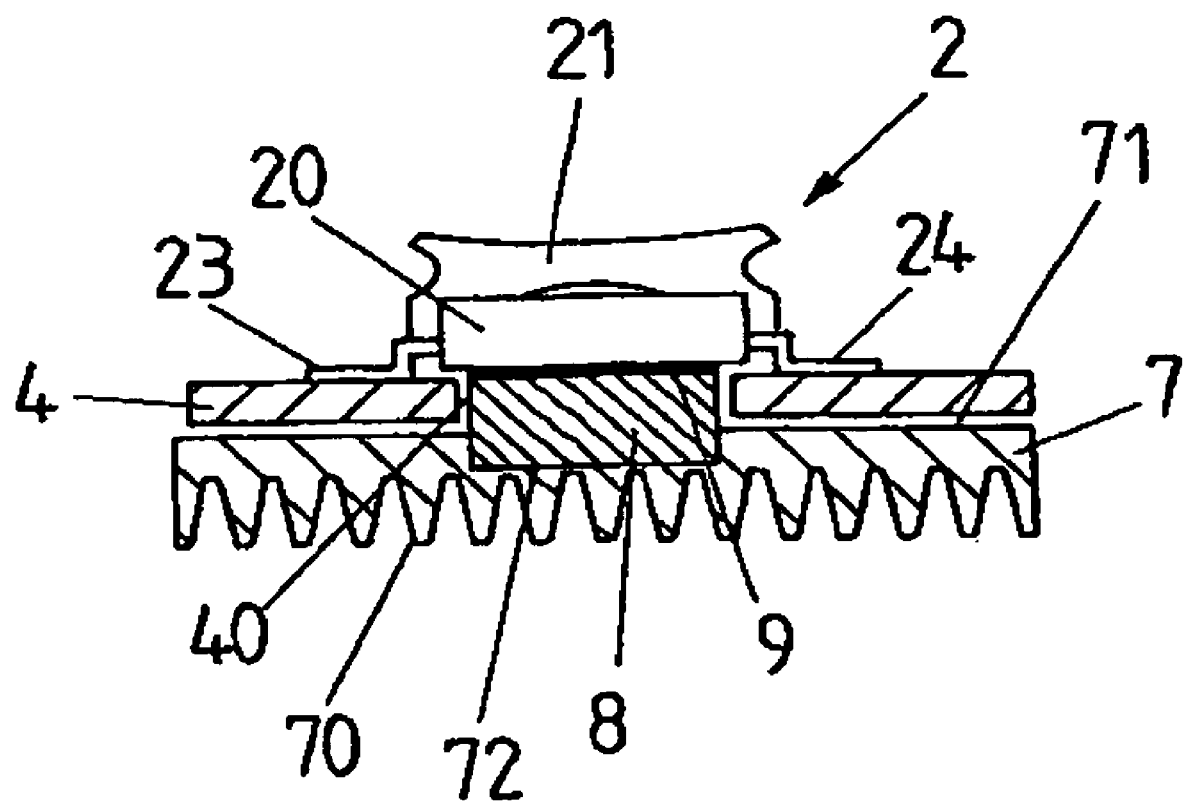
FIG. 6 shows a longitudinal section through an arrangement of a light-emitting diode with a side-emitting optical element on a printed circuit board with an aperture for making contact with the base or the cooling face of a light-emitting diode and with a thermally conductive bolt which is inserted into a depression of the heat sink.

FIG. 6 illustrates a further variant in which the light-emitting diode 2 is likewise arranged on any desired printed circuit board or board 4 and comprises an LED 20, a side-emitting optical element 21, a cooling face 22 and connecting lines 23, 24, which are connected to wiring runs on the printed circuit board or board 4. Beneath the LED 20 of the light-emitting diode 2, an aperture 40 is provided in the printed circuit board or board 4, through which a bolt 8 protrudes and is highly thermally conductively connected to the cooling face 22 of the light-emitting diode 2. The bolt 8 is pressed into a depression 72, which is milled into the surface 71 of a heat sink 7 which faces the printed circuit board 4. In a first embodiment, the bolt 8 comprises metal, in particular a metal with a higher thermal conductivity than aluminum, in particular copper, in order to dissipate the heat optimally from the LED 20 and conduct it into the heat sink 7, from where the heat is passed on to cooling ribs 70 of the heat sink 7 and is emitted to the surrounding environment.

If electrical insulation is required, in particular in the case of a conductive connection between the cooling faces of the light-emitting diodes and the anode or cathode, this can take place by a layer 9 consisting of electrically insulating, but highly thermally conductive material being inserted between the board 4 and the heat sink 5 or between the light-emitting diodes and the board, in particular between the cooling faces of the light-emitting diodes 2 and the parts 61 of the heat sink 6 which protrude through the apertures, or the bolts 8. The insulating layer 9 can comprise sprayed-on, vapor-deposited or printed-on protective layers such as varnishes or insulating thermally conductive adhesives or so-called "thermally conductive pads".

Instead of an arrangement of an insulating layer 9 between the bolt 8 and the cooling face 22 of the light-emitting diode 2, a bolt can be pressed into the depression 72 of the heat sink 7, which bolt comprises a very highly thermally conductive, electrically insulating ceramic.

In the case of a large number of light-emitting diodes arranged in accordance with any desired pattern, a number of apertures 40 which corresponds to the number of light-emitting diodes 2 are provided in the printed circuit board 4, through which apertures a corresponding number of fingers 61 of the heat sink 6 or bolts 8 protrudes and is connected in highly thermally conductive fashion and possibly in electrically insulating fashion to the cooling faces 22 of the light-emitting diodes 2.

In a first specific embodiment, a number of light-emitting diodes 2 shown in FIGS. 1 to 3 is arranged on a board 3 or 4 on the base plate 12 of a luminous chamber 1, and a heat sink 6, which engages with a number of fingers 61 which corresponds to the number of light-emitting diodes 2 through the apertures of the base plate 12 or the board 4 and is in good thermal contact with the cooling faces 22 of the light-emitting diodes 2, is fixed on the outside of the base plate 12. The cooling ribs 60 of the heat sink 6 therefore protrude from the bottom face of the luminous chamber 1 towards the outside, with the result that optimum emission of heat to the surrounding environment of the surface luminaire is ensured.

In a second specific embodiment, a number of light-emitting diodes 2 shown in FIGS. 1 to 3 is arranged on a board or printed circuit board 4 on the base plate 12 of a luminous chamber 1, and a heat sink 7, in whose surface 71 which faces the board 4 recesses or depressions 72 are milled, into which recesses or depressions 72 bolts 8 made from copper are pressed, via which bolts the heat emitted by the light-emitting diodes 2 is dissipated into the heat sink 7, from where the heat emitted by the light-emitting diodes 2 is emitted to the surrounding environment of the surface luminaire, is fixed on the outside of the board 4. For electrical insulation purposes, an electrically insulating layer 9 is provided between the bolts 8 and the cooling faces 22 of the light-emitting diodes 2.

In an alterative embodiment, a bolt consisting of a highly thermally conductive, electrically insulating ceramic is provided instead of a bolt 8 consisting of copper and is pressed into the depressions 72 of the heat sink 7.

The invention claimed is:

1. A surface luminaire with a luminous chamber in the form of a hollow fiberoptic conductor with a peripheral frame, an emission opening and a base plate which is populated at least partially with light-emitting diodes and on which sloping faces are arranged, wherein the sloping faces bridge an edge region of the base plate and a region of the peripheral frame which adjoins the base plate and form a cavity between a lower region of the peripheral frame, the edge region of the base plate and the sloping faces, in which cavity control electronics, which drive the light-emitting diodes, are arranged.

2. The surface luminaire of claim 1, wherein the sloping faces are planar.

3. The surface luminaire of claim 1, wherein the sloping faces are curved concavely or convexly.

4. The surface luminaire of claim 1, wherein the sloping faces are ribbed or folded.

5. The surface luminaire of claim 1, wherein the light-emitting diodes are arranged on the base plate in such a way that a maximum of the light emitted by the light-emitting diodes is directed parallel to the base plate or is emitted at an acute angle with respect to the base plate.

6. The surface luminaire of claim 1, wherein the luminous chamber is in the form of a diffusely reflecting hollow fiberoptic conductor.

7. The surface luminaire of claim 1, wherein the light-emitting diodes comprise side-emitting LEDs.

8. The surface luminaire of claim 1, wherein the base plate contains a thermally conducting board or is connected to a thermally conducting board.

9. The surface luminaire of claim 8, wherein the thermally conducting board is at least thermally connected to a heat sink and comprises a metal core or ceramic board.

10. The surface luminaire of claim 1, wherein the base plate comprises a printed circuit board, in which apertures are arranged beneath the light-emitting diodes.

11. The surface luminaire of claim 10, wherein parts of a heat sink which are thermally conductively connected to a base or cooling faces of the light-emitting diodes protrude through the apertures.

12. The surface luminaire of claim 11, wherein depressions are arranged in a face, which faces the light-emitting diodes, of the heat sink, into which depressions bolts are inserted and are thermally conductively connected to the base or the cooling face of the light-emitting diodes.

13. The surface luminaire of claim 12, wherein the bolts are pressed into the depressions of the heat sink and comprise metal having a higher thermal conductivity than aluminum or comprise thermally conductive, electrically insulating ceramic.

14. The surface luminaire of claim 11, wherein an electrically insulating, highly thermally conductive layer is arranged between the board and the heat sink or between the cooling faces of the light-emitting diodes and parts of the heat sink which protrude through the apertures, or the bolts.

15. The surface luminaire of claim 10, wherein a number of bolts or parts of one or more heat sinks which corresponds to the number of light-emitting diodes protrude through the apertures.

16. The surface luminaire of claim 1, wherein the emission opening is provided with a light-permeable cover.

* * * * *